Nov. 18, 1952     H. W. MULCAHY     2,618,170
HAND BRAKE FOR RAILWAY CARS

Filed July 19, 1950     2 SHEETS—SHEET 1

Inventor:
Harry W. Mulcahy.
By Henry Fuchs
Atty.

Nov. 18, 1952 H. W. MULCAHY 2,618,170
HAND BRAKE FOR RAILWAY CARS
Filed July 19, 1950 2 SHEETS—SHEET 2

Inventor:
Harry W. Mulcahy
By Henry Fuchs
Atty

Patented Nov. 18, 1952

2,618,170

UNITED STATES PATENT OFFICE 2,618,170

HAND BRAKE FOR RAILWAY CARS

Harry W. Mulcahy, Chicago, Ill., assignor to W. H. Miner, Inc., Chicago, Ill., a corporation of Delaware Application July 19, 1950, Serial No. 174,620

3 Claims. (Cl. 74—506)

This invention relates to improvements in hand brakes of the power multiplying worm gear driven type, especially adapted for use on railway cars.

One object of the invention is to provide a power multiplying hand brake mechanism including a chain winding element, a worm wheel fixed to the winding element, and a hand wheel operated worm element meshing with the worm wheel, wherein the worm wheel and the drum are shiftable to disengage the worm wheel from the worm element and thereby permit free rotation of the drum to effect release of the brakes.

A more specific object of the invention is to provide a brake mechanism as set forth in the preceding paragraph, wherein the drum is movable in one direction, axially, to effect disengagement of the worm wheel from the worm, and wherein the worm wheel is held in operative engagement with the worm by spring means which presses on the drum to move the same in a reverse direction.

Other objects of the invention will more clearly appear from the description and claims hereinafter following.

Figure 1:
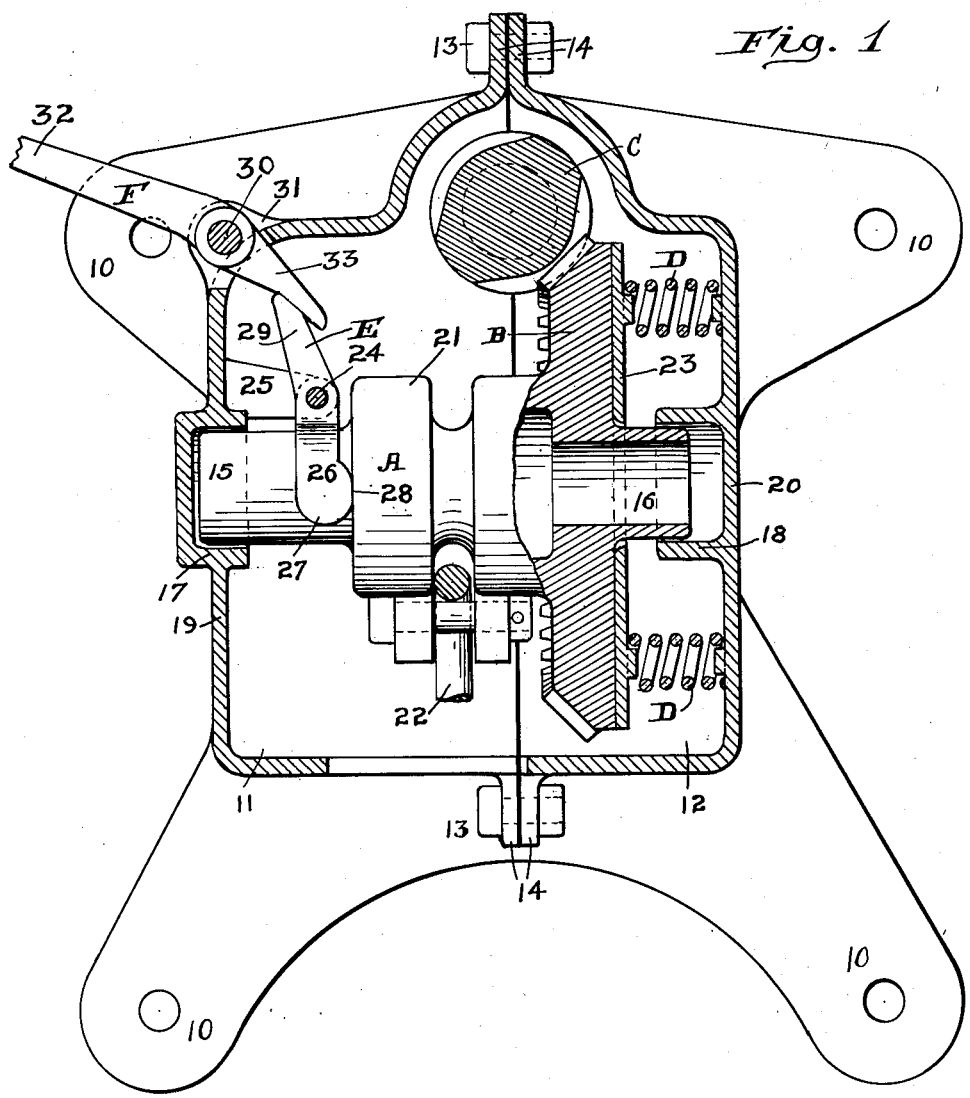
Figure 2:
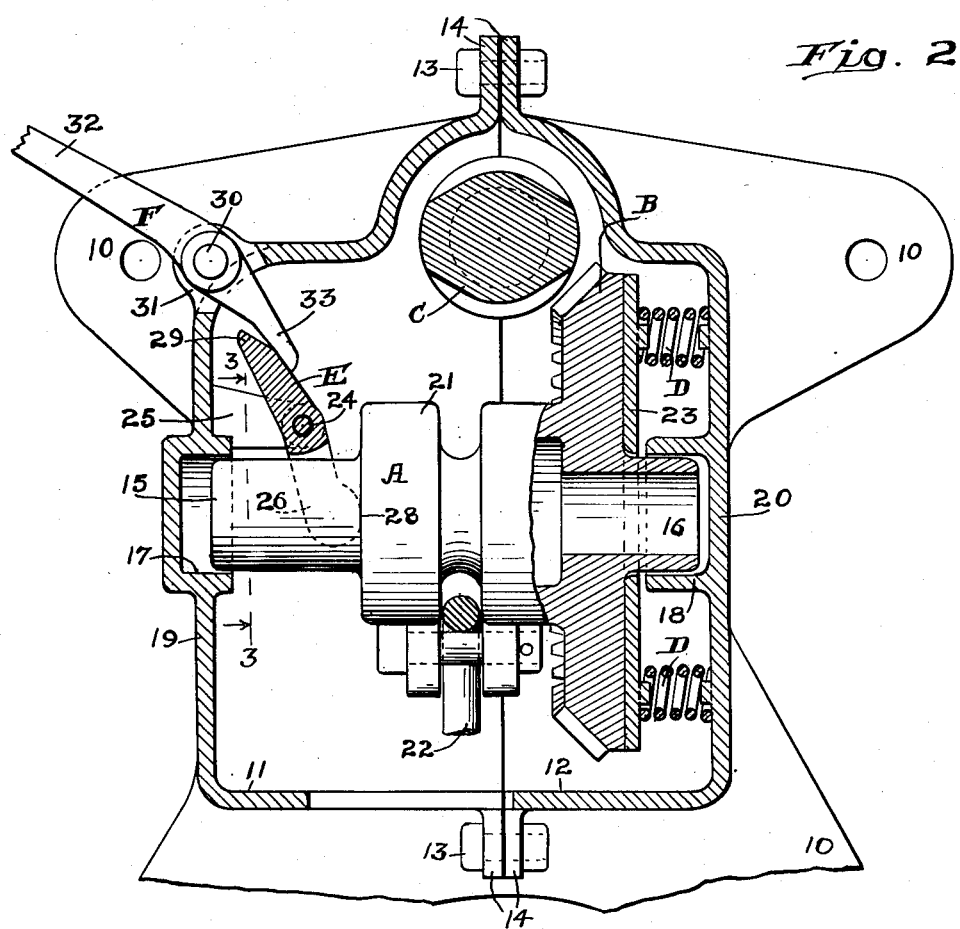
Figure 3:
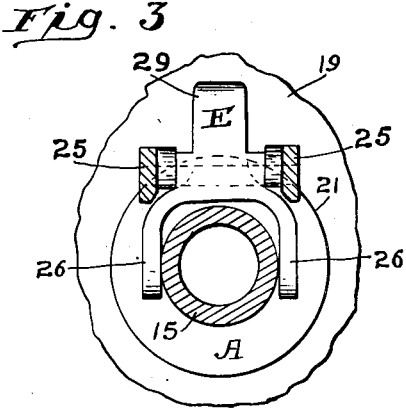

In the accompanying drawings forming a part of this specification, Figure 1 is a transverse, vertical sectional view of my improved hand brake mechanism. Figure 2 is a view similar to Figure 1, partly broken away, and showing the parts in different positions. Figure 3 is a vertical sectional view, partly broken away, corresponding substantially to the line 3—3 of Figure 2.

In carrying out my invention, I employ a housing within which the operating parts of the brake mechanism are contained, the housing being provided with securing arms 10—10 for supporting the same on the vertical end wall of a railway car. The housing comprises two sections 11 and 12 secured together by bolts 13—13 extending through flanges 14—14 on said sections.

My improved brake mechanism proper comprises broadly a shiftable chain winding drum A, a worm gear or wheel B, a worm member C actuated by the usual hand wheel, not shown, springs D—D, a shifting lever E, and a hand lever F.

The chain winding drum A has cylindrical bearing portions 15 and 16 of reduced diameter at opposite ends by which it is supported for both rotation and axial movement, the bearing portions 15 and 16, which are at the left and right hand ends, respectively, of the drum, as seen in Figure 1, are supported in inwardly projecting, tubular bearing members 17 and 18 on the vertical side walls 19 and 20 of the housing. As shown in Figure 1, the opening in the bearing member 18 is of such a length as to permit a certain amount of movement to the right of the bearing portion 16, thereby allowing the drum to be shifted to a sufficient extent to effect disengagement of the worm wheel B from the worm member C. The main body portion of the drum A presents a cylindrical section 21 on which the brake chain, which is indicated by 22, is adapted to be wound. The worm wheel B is formed integral with the drum A and is at the right hand end of the latter, as seen in Figure 1. This worm wheel is of the beveled type and meshes with the worm member C which is rotatably mounted in the upper part of the housing and has its axis extending at right angles to the axis of rotation of the drum. The worm member C is actuated by the usual hand wheel, not shown, the hand wheel being fixed to the worm member C and located exteriorly of the housing.

The springs D—D comprise a plurality of helical coils interposed between the wall 20 of the housing and a washer 23 bearing on the outer side of the worm wheel B of the drum A. The springs D—D are under initial compression and yieldingly hold the worm wheel B engaged with the worm member C.

The shifting lever E is swingingly supported between its ends by a horizontally arranged pivot pin 24 extending through the lever and having its opposite ends supported in brackets 25—25 extending inwardly from the wall 19 of the housing. The lower end of the lever E is forked, as shown most clearly in Figure 3, the fork thereof comprising spaced arms 26—26 embracing the bearing portion 15 of the drum at opposite sides and having rounded head portions 27—27 at their lower ends bearing on the vertical end face 28 of the main body portion 21 of the drum A.

The lever E comprises an upstanding arm 29, which is engaged by the lever F.

The lever F is pivoted on the housing section 11 above the shifting lever E by a pivot pin 30 supported in bearing means 31 on the housing. The lever F comprises an upstanding long arm member 32 and a depending short arm member 33. The long arm member 32 forms an actuating handle by which the lever may be manually operated. The short arm member 33 bears on the right hand side of the arm 29 of the shifting lever E. As will be evident, when the lever F is swung to the right, from the position shown in Figure 1 to the position shown in Figure 2, the short arm member 33 thereof forces the upper end portion of the lever E to be swung to the left, thereby swinging the arm 26 to the right and shifting the drum A and the worm wheel B to the right to disengage the latter from the worm member C, thereby permitting free rotation of the drum A to effect release of the brakes. When the pressure is removed from the lever F, the springs D force the worm wheel B into engagement with the worm member C and the parts of the mechanism are thus restored to operative position.

I claim:

1. In a hand brake mechanism, the combination with a chain winding drum; of bearing means supporting said drum for axial sliding and rotary movement; a beveled worm wheel fixed to said drum for rotation in unison therewith; a worm normally meshing with said worm wheel, said drum and worm wheel being shiftable in axial direction toward and away from said worm; fixed spring abutment means; a washer bearing on one end of said drum; coil springs under initial compression interposed and reacting between said abutment means and washer for forcing said drum and worm wheel toward said worm into operative engagement therewith; and lever means engaging said drum for shifting said drum and worm wheel away from said worm.

2. In a hand brake mechanism, the combination with a chain winding drum; of bearing means supporting said drum for rotary and axial sliding movement; a beveled worm wheel fixed to said drum for rotation in unison therewith; a worm normally meshing with said worm wheel, said drum and worm wheel being shiftable in axial direction toward and away from said worm; spring means for forcing said drum and worm wheel toward said worm into operative engagement therewith; and lever means for shifting said drum and worm wheel away from said worm, said lever means comprising a shifting lever pivoted between its ends and having one end thereof in engagement with said drum and a second lever pivoted between its ends and having an operating handle lever at one end thereof, the other end of said last named lever being operatively engaged with the end of said shifting lever opposite to the end thereof which is engaged with the drum.

3. In a hand brake mechanism, the combination with a chain winding drum rotatable about a horizontal axis, said drum having an enlarged portion on which the brake chain is windable; of a beveled worm wheel fixed to said drum for rotation in unison therewith; a worm normally meshing with said worm wheel, said drum and worm wheel being shiftable in axial direction toward and away from said worm; spring means for forcing said drum and worm wheel toward said worm into operative engagement therewith; and lever means for shifting said drum and worm wheel away from said worm, said lever means comprising a shifting lever and an actuating lever, said shifting lever being pivoted between its ends and having one end in shouldered engagement with said enlarged portion of said drum, said actuating lever being pivoted between its ends and having one end engaged with the other end of said shifting lever, and having an operating handle portion at its other end.

HARRY W. MULCAHY.

REFERENCES CITED

The following references are of record in the file of this patent:

UNITED STATES PATENTS

| Number | Name | Date |
|---|---|---|
| 1,193,089 | Wagner et al. | Aug. 1, 1916 |
| 1,238,168 | McNulty | Aug. 28, 1917 |
| 2,485,026 | Williams | Oct. 18, 1949 |
| 2,492,080 | Williams | Dec. 20, 1949 |
| 2,529,064 | Williams | Nov. 7, 1950 |